W. G. LESTER, L. C. NAESER AND W. J. PULLOCK.
NUT LOCK.
APPLICATION FILED SEPT. 2, 1919.
1,370,216.
Patented Mar. 1, 1921.
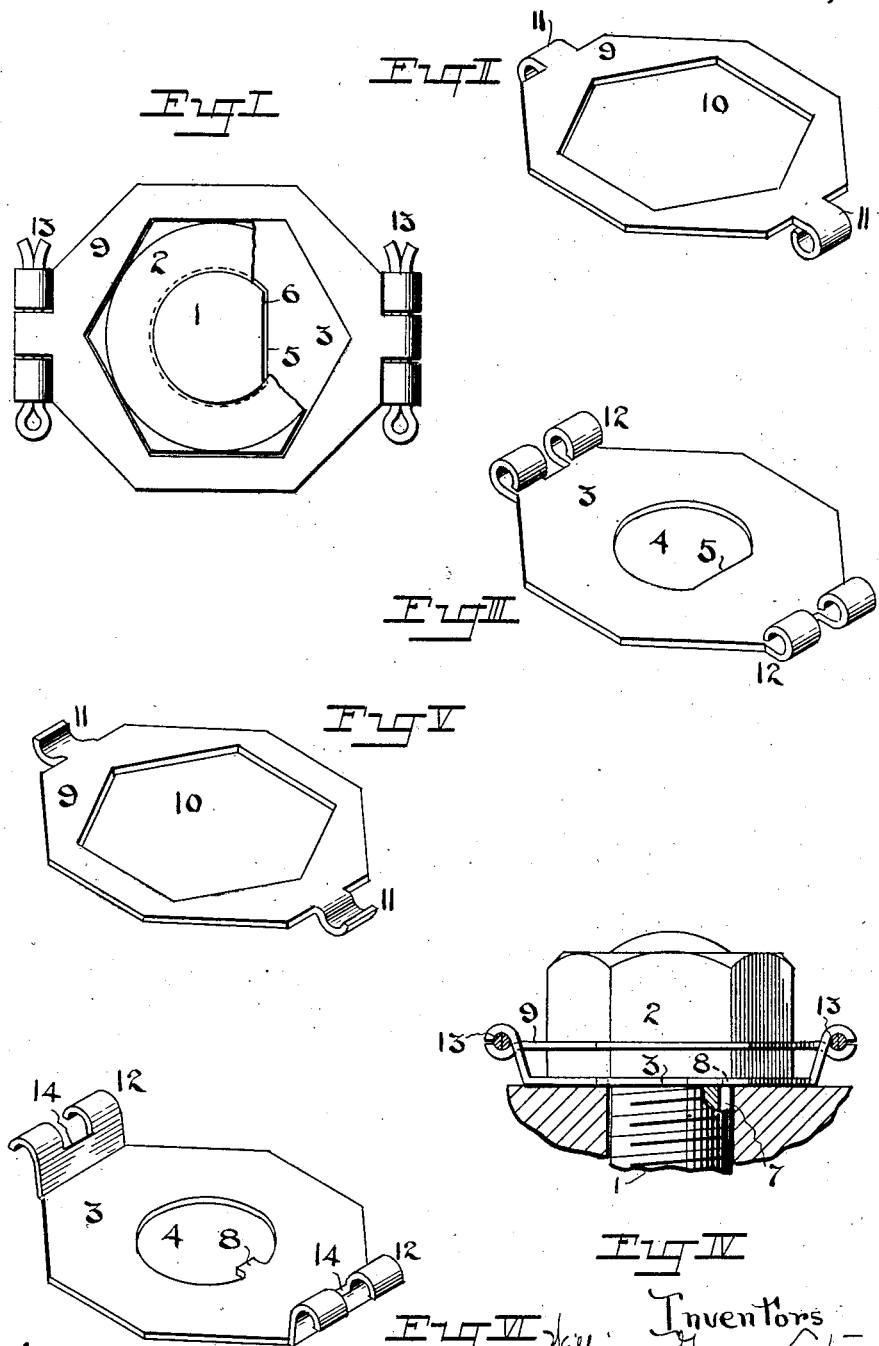

UNITED STATES PATENT OFFICE.

WILLIAM G. LESTER, LINDSAY CLAUDE NAESER AND WILLIAM JOHN PULLOCK, OF GERMISTON, TRANSVAAL, SOUTH AFRICA.

NUT-LOCK.

1,370,216.   Specification of Letters Patent.   Patented Mar. 1, 1921.

Application filed September 2, 1919. Serial No. 321,141.

*To all whom it may concern:*

Be it known that we, WILLIAM GEORGE LESTER, a British subject, residing at 6 Staff Rooms, Simmer Deep Limited, Germiston, LINDSAY CLAUDE NAESER, a British subject, residing at 6 Staff Rooms, Simmer Deep Limited, Germiston, and WILLIAM JOHN PULLOCK, a British subject, and residing at Simmer and Jask Proprietary Mines Limited, Germiston, Transvaal Province of the Union of South Africa, have invented certain new and useful Improvements in Nut-Locks, of which the following is a specification.

The object of the present invention is to provide an effective nut lock which can be cheaply manufactured from metal plate and which is capable of indefinite re-use.

In the accompanying drawing:

Figure I is a plan of a bolt and nut fitted with one constructional form of the invention.

Figs. II and III show the parts of the lock.

Fig. IV is an elevation of a bolt and nut fitted with another constructional form and, Figs. V and VI show the parts of such other form.

1 and 2 respectively represent an ordinary bolt and nut. 3 is a washer which is perforated at 4 to pass over the bolt and on which the nut 2 seats. The washer is non-rotatively engaged with the bolt, as by forming its orifices 4 with a chord 5 (Figs. I and III) and forming a corresponding flat 6 on the side of the bolt. When however, the bolt is specially made for use with the present invention, it is preferred to slot the bolt longitudinally as indicated at 7 (Fig. IV) and to provide the washer with a tongue 8, Figs. IV and VI, which engages said slot.

9 is a guard ring formed with a central aperture 10 of the polygonal form to fit non-rotatively about the nut. The ring 9 is formed with bent ears 11 and the washer 3 is formed with complementary ears 12, said ears being such that when the washer and ring are assembled in position, said ears register to receive split pins or the like 13 by which the washer and ring are locked together both against rotation and against relative movement longitudinally of the bolt. Upon removing the split pin 13 the guard ring 9 can be lifted off the nut, leaving the same free to be tightened or slacked.

The washer and guard ring do not require to be deformed for use and may therefore be used over again if there is occasion to remove them from the bolt.

The guard ring and washer may be stamped from sheet metal. In the construction of Figs. I to III the ears 11, 12 are turned to substantially a complete annular shape. In the modified construction of Figs. IV to VI the ears 12 of the washer are turned downward to form substantially the upper half of a cylinder while the ears 11 of the guard ring are turned upward to form the lower half of the cylinder.

The ears 11 of this construction so rest on shoulder 14 between the ears 12 that said halves of the cylinder are positioned co-axially and form in effect a complete cylindrical socket for the split pins 13, which hold the guard ring down on said shoulder 14. This form of construction is cheaper to make than the first form owing to the less degree of bending of the ears.

We claim:

A nut lock comprising a washer adapted to engage a bolt non-rotatively and formed with half downturned ears, a guard ring adapted to engage a nut peripherally and formed with half upturned ears, said washer also providing a shoulder on which the guard ring is so supported as to position the several ears co-axially to receive a pin or the like for securing the guard ring to the washer.

In testimony whereof we affix our signatures.

WILLIAM G. LESTER.
LINDSAY CLAUDE NAESER.
WILLIAM JOHN PULLOCK.